Sept. 15, 1970  J. T. SCALES  3,528,109
PROSTHETIC BONE JOINT SOCKET
Filed Jan. 31, 1968

United States Patent Office 3,528,109
Patented Sept. 15, 1970

3,528,109
PROSTHETIC BONE JOINT SOCKET
John Tracey Scales, Stanmore, Middlesex, England, assignor to National Research Development Corporation, London, England, a British corporation
Filed Jan. 31, 1968, Ser. No. 701,901
Claims priority, application Great Britain, Feb. 2, 1967, 5,158/67
Int. Cl. A61f 1/24
U.S. Cl. 3—1
9 Claims

ABSTRACT OF THE DISCLOSURE

A prosthetic device for use as an acetabular replacement which comprises a generally cup-shaped member having divergent fixation means attached to or integral with its outer surface and extending therefrom for a sufficient length to achieve an intramedullary fixation when the device is in position in a patient.

---

Figure 1:
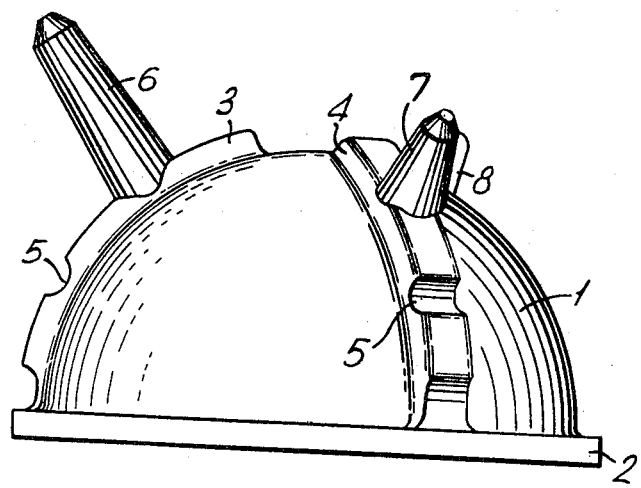

This invention relates to a prosthetic device for use as an acetabular replacement.

Any acetabular replacement must be stabilised in the pelvic bone, and the means of stabilisation should be such as to make the insertion of the replacement, in the space available, as easy as possible and the replacement as secure as possible. Various means of stabilisation have been tried in the past. For example, cups have been made for use in conjunction with a layer of cement to attach the cup to the acetabulum having multiple short spikes on their outer surface. These short spikes, when pressed into the cement, prevent rotation of the cup, but do not penetrate into the bone. It has now been realised that this method of fixation is disadvantageous in that forces tending to dislodge the cup will exert tension on the cement, and cements tend to be weak with respect to tensile forces. Other cups have been made having longer spikes parallel to the axis of insertion which do penetrate into the bone. These prevent rotation but do not prevent extraction of the cup. It has been proposed to anchor the cup by using divergent nails, but this is disadvantageous in that the nails must be driven into the bone by independent mechanical means and also in that an inner cup must be provided inside the cup through which the nails pass, to prevent them backing out. There is also the disadvantage with all fixation by nails that they may penetrate a cystic cavity and thus not anchor the device securely.

According to the invention there is provided a prosthetic device for use as an acetabular replacement which comprises a generally cup-shaped member having divergent fixation means attached to or integral with its outer surface and extending therefrom for a sufficient length to achieve an intramedullary fixation when the device is in position in a patient.

The device is designed to be used together with a self-hardening or self-curing gap-filling agent. When the device is to be inserted into a patient, a cavity or cavities are first cut in the bone to receive the fixation means, a suitable quantity of gap-filling agent is put into the cavity or cavities and the acetabulum, and the device is placed in position. Since the fixation means are divergent, forces tending to dislodge the cup will bring compressive rather than tensile forces to bear on at least part of the gap-filling agent and thus the cup will be more securely anchored in the bone than if the gap-filling agent were entirely in tension.

The divergent fixation means may comprise a divergent flange mounted part way up the outer surface of the cup. Alternatively a plurality of mutually divergent spikes may be used as fixation means. For example, the device may conveniently have three spikes arranged at approximately equiangular relationship to each other and normal to the surface of the cup. All the spikes can be the same length, or the cup can have, for example, one relatively long and two relatively short spikes. Preferably all the spikes are at least 5/16 inch, particularly between 5/16 and 13/16 inch, long, and preferably at least one spike is at least 11/16 inch long. The fixation means should preferably not project sideways beyond the outside rim of the cup that is to say the fixation means should be confined within a notional cylindrical extension of the rim of the cup parallel to the axis of the cup, so that it is not necessary to cut the edge of the acetabulum when the cup is being inserted.

It is desirable that, when the cup is in position, the gap-filling agent should not only be present in the cavities but should also extend between them, so as to form a layer. To achieve this the cup may carry on its outer surface spacing elements which rest against the bone when the cup is in position so as to maintain a space between the bone and the surface of the cup which is filled with resin so that the applied load is evenly distributed onto the bone. The spacing elements may be designed so that they also aid in enabling a firm grip to be achieved between the cup and the resin.

The spacing elements can take the form of short studs or, alternatively, they can take the form of bars lying along the outer surface of the cup and extending part way inwards from its circumference and having serrations. These bars should not meet one another at the centre so that surplus resin in any section can traverse to the others, so producing a layer of resin whose thickness is controlled by the thickness of the bars. The cup is preferably designed so that it allows a one-piece wax-pattern to be injection moulded.

Figure 2:
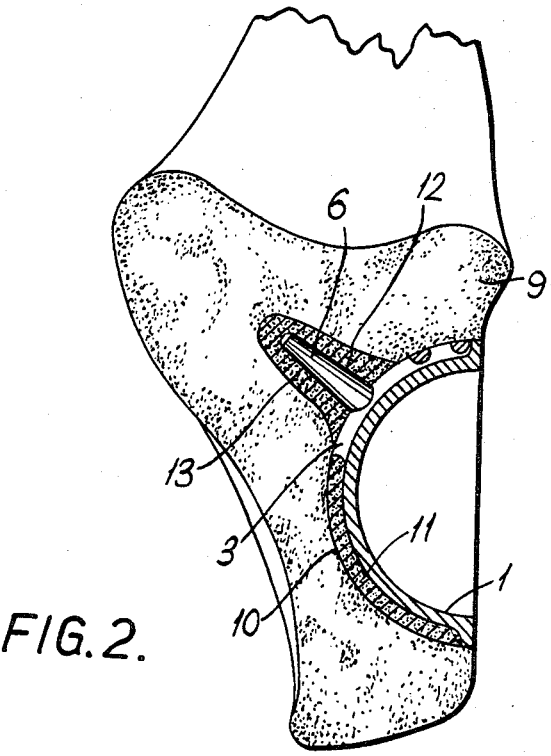

A specific embodiment of the invention will now be described, with reference to the accompanying drawing, of which FIG. 1 is a perspective view of the cup, and FIG. 2 is a sectional view of the cup in position.

A cup 1 has a circumferential rim 2 and three spacing elements arranged at 120° to each other of which two, 3 and 4, can be seen in FIG. 1, each element having a serration 5. The spacing element 3 carries a spike 6 which projects normally to the surface of the cup and is 13/16 inch long. The spacing elements 4 and the element which is not shown carry spikes 7 and 8 respectively which also project normally to the cup and are 11/16 inch long. It will be noted that the spacing elements project from the cup by a distance which is significantly shorter than the spikes.

In FIG. 2 the cup 1 is shown in position in the pelvic bone 9. The cup 1 is held away from the acetabulum 10 by the spacing elements, of which the element 3 can be seen so that there is a layer of self-curing resin 11 between the cup 1 and the bone 9. It can be seen that the spike 6 lies in a cavity 12 which has been cut into the bone, and is surrounded by self-curing resin 13. The resin shown at 11 extends all around the cup 1, and thus is continuous with the resin shown at 13.

I claim:
1. A prosthetic device for use as a bone joint socket replacement, which device is designed to be used together with a self-hardening or self-curing gap-filling agent within and between a plurality of cavities cut in the bone at the joint socket, said prosthetic device comprising: a generally cup-shaped member, means defining a plurality of relatively long, mutually divergent, intramedullary fixation elements secured on and projecting from the outside of said generally cup-shaped member for insertion in the bone cavities; and means defining a plurality of relatively short spacer elements secured on and projecting from the outside of said generally cup-shaped member for contact with the joint socket to insure sufficient spacing for accommodation of a desired amount of the gap-filling agent in the bone cavities, surrounding the fixation elements therein and between the joint socket and the outside of the cup, for even distribution of applied load to the bone adjacent the joint socket.

2. A device according to claim 1 wherein said fixation elements comprise spikes projecting substantially normally to the cup-shaped member outside surface.

3. A device according to claim 1 wherein said fixation elements comprise a plurality of spikes disposed in approximately equiangular relationship to each other.

4. A device according to claim 1 wherein said fixation elements lie within an imaginary cylindrical extension of the outer peripheral extent of the cup-shaped member parallel to the longitudinal axis of the cup-shaped member.

5. A device according to claim 1 wherein said spacer elements comprise a plurality of mutually separate bars disposed transversely to the outer peripheral extent of the cup-shaped member.

6. A device according to claim 1 wherein said spacer means comprise a plurality of mutually separate bars.

7. A device according to claim 2 wherein said spikes are each at least $5/16$ inch long.

8. A device according to claim 7 wherein said spikes are each from $5/16$ to $13/16$ inch long.

9. A device according to claim 8 wherein at least one of said spikes is $11/16$ inch long.

References Cited

UNITED STATES PATENTS

| | | |
|---|---|---|
| 2,668,531 | 2/1954 | Haboush. |
| 2,910,978 | 11/1959 | Urist. |
| 3,067,740 | 12/1962 | Haboush. |

FOREIGN PATENTS

| | | |
|---|---|---|
| 1,448,955 | 7/1966 | France. |
| 124,585 | 12/1959 | Russia. |

OTHER REFERENCES

Vitallium Surgical Appliance (catalog), Austenal Medical Div., Howmet Corp., New York, N.Y., 1964, p. 30 relied upon, McBride Acetabulum Cups No. 6429 and Gaenslen Acetabulum Cups No. 6937.

"Replacement of Arthritic Hips By The McKee-Farrar Prothesis," by G. K. McKee et al., J. of Bone and Joint Surgery, vol. 48B, No. 2, pp. 245–259, May 1966.

RICHARD A. GAUDET, Primary Examiner

R. L. FRINKS, Assistant Examiner

U.S. Cl. X.R.

128—92